May 9, 1967  F. C. STEMPEL ETAL  3,318,134
THERMAL INSTRUMENT CALIBRATION SYSTEM
Filed Sept. 30, 1964  3 Sheets-Sheet 1
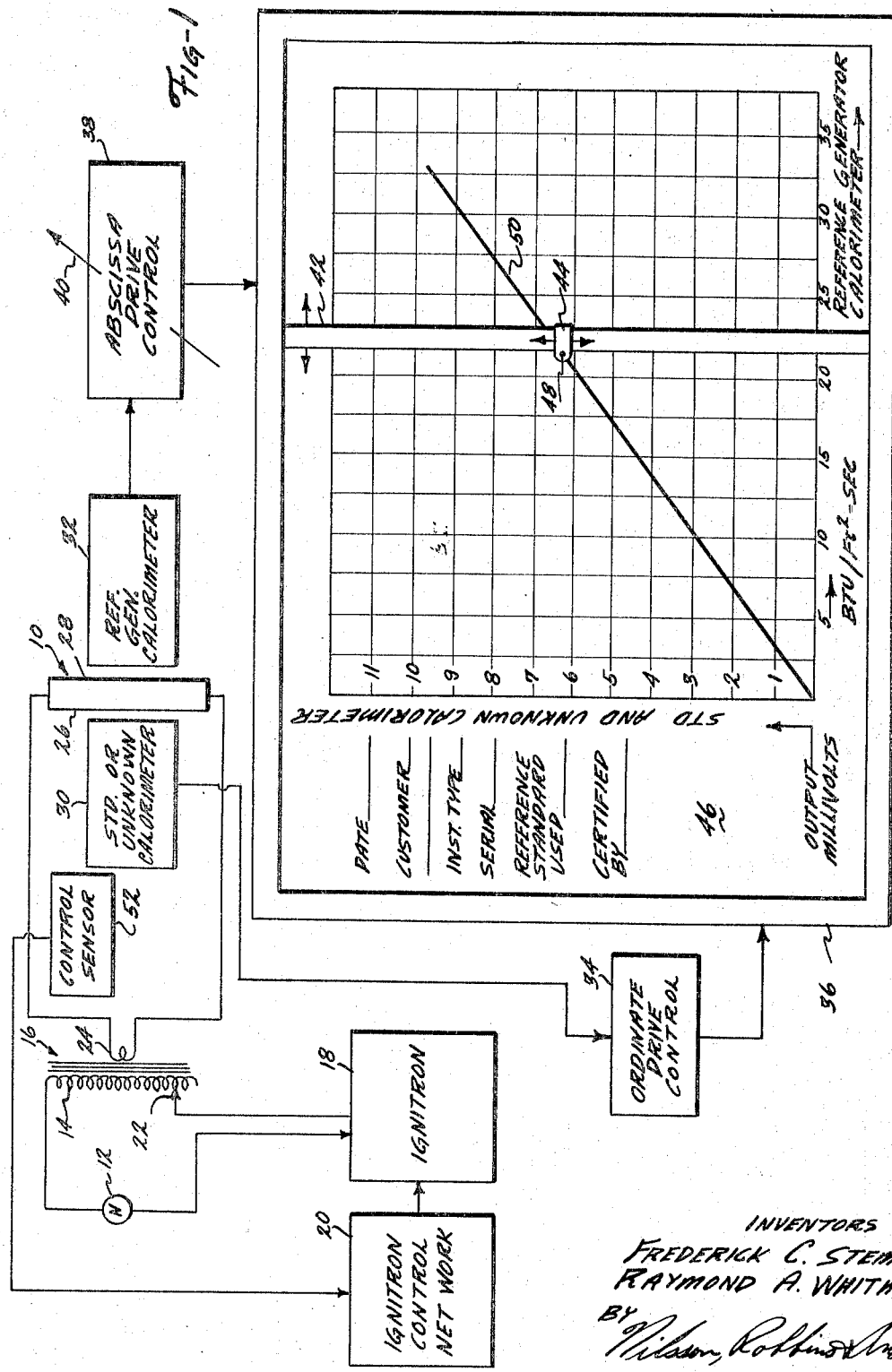
INVENTORS
FREDERICK C. STEMPEL
RAYMOND A. WHITMORE
BY
ATTORNEYS May 9, 1967  F. C. STEMPEL ETAL  3,318,134
THERMAL INSTRUMENT CALIBRATION SYSTEM
Filed Sept. 30, 1964  3 Sheets-Sheet 2
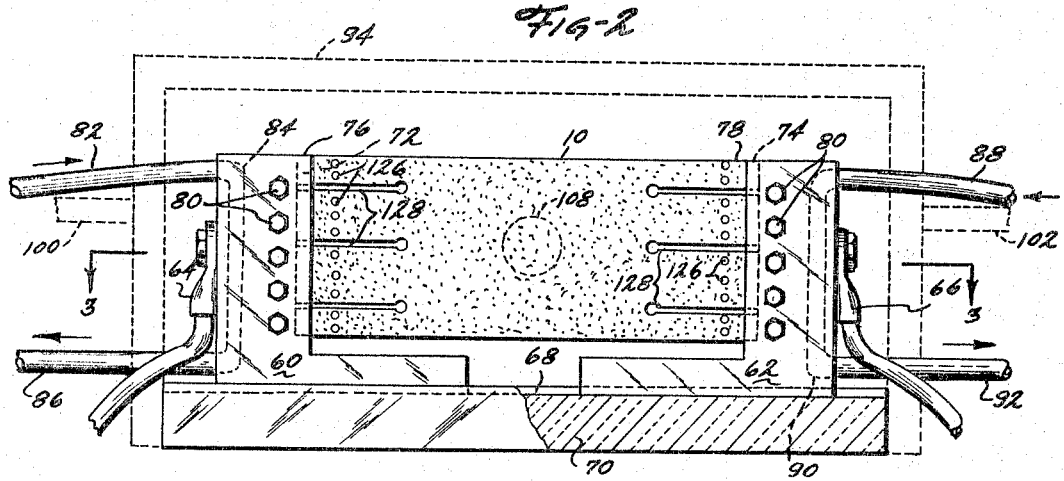
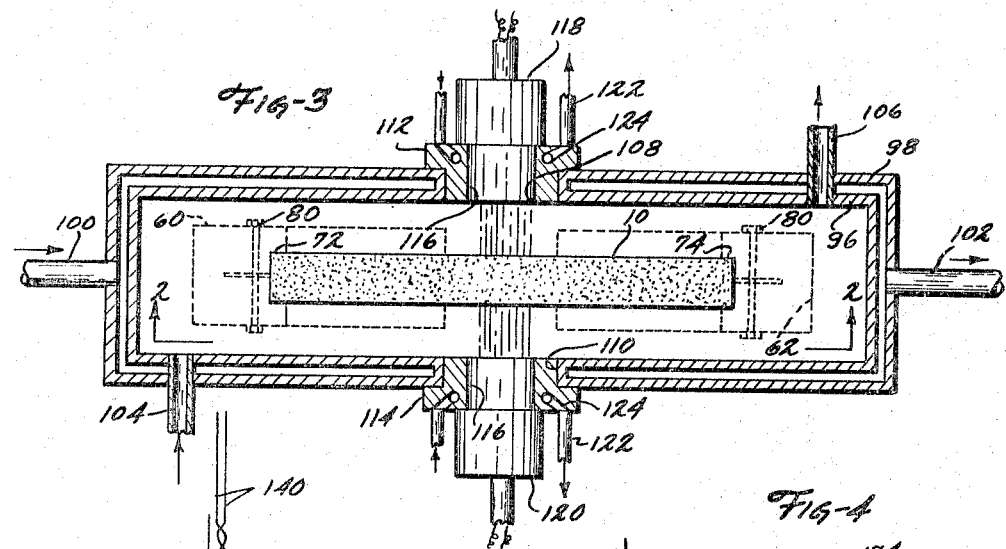
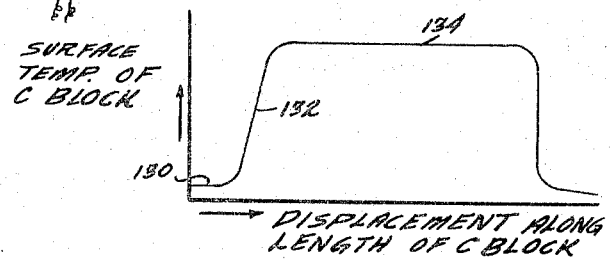
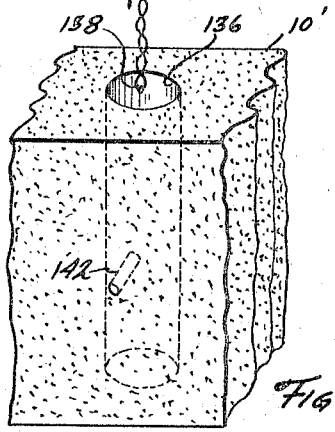
INVENTORS
FREDERICK C. STEMPEL
RAYMOND A. WHITMORE
BY Wilson, Robbins & Anderson
ATTORNEYS May 9, 1967 F. C. STEMPEL ET AL 3,318,134
THERMAL INSTRUMENT CALIBRATION SYSTEM
Filed Sept. 30, 1964 3 Sheets-Sheet 3

INVENTORS
FREDERICK C. STEMPEL
RAYMOND A. WHITMORE
BY Nilsson, Robbins & Anderson
ATTORNEYS

United States Patent Office 3,318,134
Patented May 9, 1967

3,318,134
THERMAL INSTRUMENT CALIBRATION SYSTEM
Frederick C. Stempel, Brea, and Raymond A. Whitmore, La Habra, Calif., assignors to Hy-Cal Engineering, Santa Fe Springs, Calif., a corporation of California
Filed Sept. 30, 1964, Ser. No. 400,474
14 Claims. (Cl. 73—1)

This invention relates generally to thermal energy flux and temperature sensors and related instrumentation and more particularly, to their testing and calibration and apparatus therefor.

In recent years there has developed an acute need for highly precise thermal instrumentation including heat rate sensors which are direct and rapid reading and which are widely available in different ranges of thermal and geometric parameters. For example, in the development of space and missile metals and rocket engines and other thermally high performance mechanisms, precise thermal instrumentation is required and often the operating conditions preclude the use of conventional sensors for reasons, for example, of the rapid transient-like thermal characteristics to be measured.

As an example of recent approaches in the art toward satisfying this need in the case of directly reading rapid response heat rate sensors, it has been largely and satisfactorily answered by the invention and development of miniature calorimeters comprising a metallic foil disc secured across a circular opening in a metallic base member or heat sink block. When it is exposed to a source of thermal radiation the central portions of the foil disc are maintained at an elevated temperature with respect to the heat sink body, due to the relatively low thermal conduction of the thin foil. With the heat sink body remaining at a constant temperature, a readily achievable condition, the temperature of the center of the foil is a direct and substantially instantaneous measure of the magnitude of incident heat flux. In other words, the temperature differential or temperature drop between the center and the periphery of the foil is then a function of the radial heat current through the foil which in turn is proportional to the heat flux incident upon the foil. The temperature differential is measured by a thermocouple pair formed (1) at the center of the foil with a lead of the same metallic composition as that of the heat sink body, and (2) around the periphery of the foil where it is metallurgically bonded to the heat sink body.

It may be noted that the heat sink body temperature does not exert any first order effect on the thermocouple voltage difference; only the temperature differential is of any electrical consequence. Accordingly the heat sink temperature may vary or may be held at any desired level, as by force cooling by circulating therethrough a coolant fluid. This does provide an improvement in accuracy and assures a longer lifetime for the sensor.

This class of calorimeters has been developed to a very high level of dependability and long term reliability. However, as with most precision energy transducers, the output characteristic is dependent upon its geometrical and metallurgical properties. Hence for absolute performance, as opposed to relative measurements, the precision of the instrument is only as good as its calibration with respect to an absolute standard.

Calibration techniques and facilities heretofore available for calorimeters have typically been based on approaches which involve adapting other systems to the task and which constitute a serious compromise in reliability, convenience, versatility, basic capability of operating over wide flux rates and with continuously variable control, speed of obtaining final calibration results, and mechanical compactness of the equipment.

Many of the prior art systems are basically tied to temperature measuring techniques and rely on converting temperature effects into heat flow data. Such techniques and systems are unwieldy and result in a compromise in accuracy and repeatability unless operated by highly skilled personnel.

Some prior art calibration methods do utilize a source of heat flux such as gas torches, lamps, multi-element burners, or the like, and sometimes rely on or are at least affected by convection between the source and the sensor. However, such sources suffer the disadvantage of emitting energy in an uneven distribution, either in angular direction or laterally across its emitting surface, or both; so that accuracy of calibration depends upon viewing angle and particular area of emitter as seen by the sensor. Furthermore, any convection path between source and sensor is vulnerable to distortion and hence constitutes a source of error. It is often the case with such systems that meaningful calibration data can only be obtained after time consuming and laborious calibration and interpretation by an expert.

It is therefore an object of the present invention to provide a system and method of calibrating thermal instruments which are not subject to these and other disadvantages of the prior art.

It is another object to provide such a system which provides directly in permanent record form, a complete calibration of heating rate sensors over extremely wide heat flux ranges.

It is another object to provide such a system which provides such calibration exceedingly accurately and quickly without attendance by skilled personnel.

It is another object to provide such apparatus and method which calibrates heat flux sensors by automatic comparison to a known standard calorimeter.

It is another object to provide such a system which permits very wide angle viewing of a radiant heat source by a test sensor, that is, one to be calibrated.

It is another object to provide such a system which embodies an effectively infinite radiant heat plate having an effectively completely uniform radiating surface.

It is another object to provide such a system which provides a rapidly controllable heat flux rate.

It is another object to provide such a system in which the heat source is stable over a long lifetime with respect to chemical and thermomechanical deterioration.

It is another object to provide such a system in which there is provided total comparison of a test calorimeter with a standard calorimeter and in which both are exposed identically to the same heat flux.

It is another object to provide such a system in which there are no appreciable heat convection effects between the radiation source and the sensor.

Very briefly, these and other objects are achieved in accordance with one example of the invention in which a specially machined, elongated block of graphite carbon is electrically connected between a pair of high current capacity electrodes. When a current, controlled by ignitron techniques, is passed through the block, it radiates heat from its surfaces at rates of up to several hundred B.t.u.'s per square foot per second.

The radiating block is symmetrical as seen from two opposite surfaces and is thermally isolated from the external environment by a rigid, water cooled shielding structure which is also symmetrical in the same sense. The symmetrical sides of the shield are each apertured to receive and support a calorimeter. Due to the substantially perfect symmetry, each calorimeter receives very nearly the same radiation, however it is not required, as will become apparent below, that the two oppositely disposed calorimeters receive exactly the same radiation.

The electrical output of one calorimeter, a standard whose output versus incident heat flux is accurately known, is connected to the abscissa drive of a cartesian-plotting pen recorder. The output of the other calorimeter, a reference generator designed to operate in approximately the same heat flow range, is connected to the ordinate drive of the plotter-recorder. The characteristics of the reference calorimeter are arbitrary and need not be known, except that both it and the standard are chosen to have substantially perfect linearity in their voltage output versus heat flux input curve. The curve of the standard calorimeter is drawn or printed in advance on the recording paper of the pen recorder.

The gain of the ordinate drive is preset to match the scale of the recording paper being used, and the abcissa gain is adjusted until the curve of the standard calorimeter output versus reference generator calorimeter output, while the heat radiation of the radiating block is varied over a wide range, is coincident on the recorder with the known curve, a straight line, of the standard calorimeter.

Then without in any manner affecting the reference generator in any way either physically or electrically, the standard calorimeter is replaced by the unknown calorimeter to be tested and calibrated. Thusly the unknown calorimeter views exactly the same portion of the radiating block as did the standard calorimeter, and in precisely the same manner. The electrical leads of the unknown calorimeter are connected to the ordinate drive of the plotter recorder and with a varying of the heat flux from the radiant block, the recorder plots a curve of electrical output in millivolts from the unknown calorimeter on the ordinate versus output of the reference generator precisely calibrated by the previous step in heat flux of B.t.u. per square foot per second. Further details of these and other novel features and aspects and their operation as well as additional objects and advantages of the invention will become apparent and be best understood from a consideration of the following description taken in connection with the accompanying drawings, which are all presented by way of an illustrative example only and in which:

FIG. 1 is essentially a block diagram illustrating an example of a thermal instrument system and method in accordance with the principles of the present invention;

FIG. 2 is an elevational view of an example of a thermal radiation block assembly portion of the system illustrated in FIG. 1;

FIG. 3 is a horizontal sectional view of the structure illustrated in FIG. 2 taken along the lines 3—3 thereof;

FIG. 4 is a graph plotting surface temperature of the radiating carbon block illustrated in the previous figures as a function of displacement along the length of the block;

FIG. 5 and FIG. 6 are partially broken away, perspective views of portions of an alternative form of the present invention;

Figure 6:
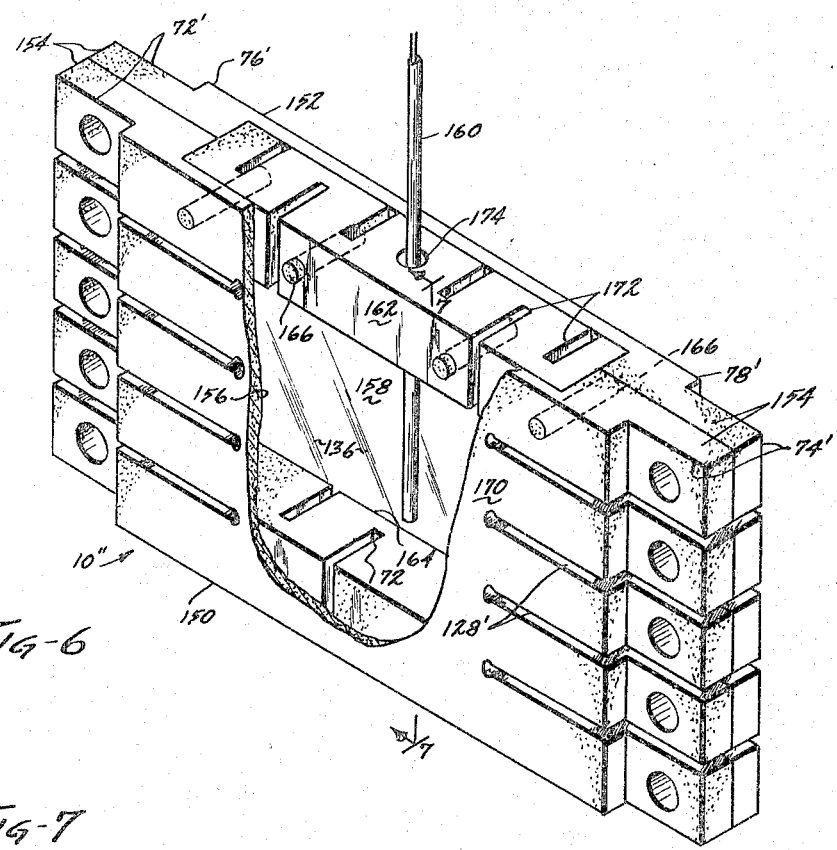

With specific reference now to the figures in more detail, it is stressed that the particulars shown are by way of example and for purposes of illustrative discussion only, and are presented in the cause of providing what is believed to be the most useful and readily understood description of the principles and conceptual aspects of the invention. In this regard no attempt is made to show structural details of the apparatus in more detail than is necessary for a fundamental understanding of the invention, the description taken with the drawings making apparent to those skilled in the art, how the several forms of the invention may be embodied in practice. In particular the detailed showing is not to be taken as a limitation upon the scope of the invention which is defined by the appended claims forming, along with the drawings, a part of this specification.

In FIG. 1 an example of a calibration instrumentation system of the invention is illustrated, which includes a simplified representation of an ignitron type power supply system for heating a thermally radiating graphite block 10 by passing therethrough relatively large magnitudes of alternating current electric energy. The electrical supply sub-system includes an external source of alternating current indicated at 12 which, in this example, is a 440 volt 200 ampere capacity commercial utility company supply. The source 12 is coupled to the primary winding 14 of a step-down power transformer 16. Intercoupled between the source 12 and the winding 14 is an ignitron electric energy flow control device 18, the duty cycle conduction characteristic of which is in turn controlled or "ignited" by an ignitron control network 20.

The movable tap 22 associated with the transformer 16 is included in the figure to indicate in general that the turns ratio and other energy transfer parameters of the transformer may be varied, as for example, by shorting out turns of either the primary or secondary winding, or by adjustment of actually movable taps or temperature control or the like, for example. In this connection it may also be noted that the transformer 16 is in this example water cooled by means not shown for purposes of maximizing its efficiency with regard to energy transfer as a function of physical mass and size.

The secondary winding, indicated at 24, is coupled to the terminals of the graphite radiating block 10 and low voltage currents of up to thousands of amperes are passed through the graphite radiating block the resistivity of which is selected for converting a large proportion of the electrical energy associated with the electrical current into thermal energy which is radiated from its opposite surfaces 26, 28. As will be discussed in more detail below, these opposite surfaces are machined in a manner to constitute substantially identical thermally radiating surfaces. The standard or, at a subsequent time, unknown calorimeter 30 is exposed to the radiant flux from the mid-portion of the surface 26 while the reference generator calorimeter 32 is exposed to the opposite surface 28. For all but higher order effects then, the two calorimeters 30, 32 are exposed identically to a particular thermal flux rate which is substantially identical in all respects on either side of the graphite block 10.

The electrical output of the standard or unknown calorimeter 30 is coupled to the electro-mechanical ordinate drive control network 34 of a cartesian, or "x-y," plotter recorder 36. Similarly the electrical output of the reference generator calorimeter 32 is coupled to the electro-mechanical abscissa drive control network 38 which includes a variable gain control apparatus indicated by the arrow 40.

The cartesian plotter recorder 36 includes a traveler bar 42 which can travel to the left or right, as seen in the figure, in a manner such that its displacement at any point in time is proportional to the magnitude of voltage, or electromotive force, impressed upon the input terminal of the abscissa drive control 38 from the reference generator calorimeter 32. Similarly the recorder includes a pen stylus carriage 44 which travels longitudinally or up and down, as seen in the figure, along the traveler bar 42 and its displacement therealong at any point in time is proportional to the magnitude of electric signal impressed upon the input terminal of the ordinate drive control network 34.

A paper calibration sheet 46, prepared or printed in advance, is fixed over a table surface of the plotter 36 below the bar 42 and the pen stylus carriage 44, in a manner such that the pen stylus 48 scribes a recording mark on the face of the sheet 46 thusly to plot and record a characteristic thereon, as a function of change over a period of time, of the voltage input of the ordinate drive control 34 versus the voltage input to the abscissa drive control network 38.

In operation the standard calorimeter 30 is placed in a mounting so that its position is exactly repeatable with respect to the radiating surface 26 of the graphite block 10 and its electrical output is coupled as shown to the ordinate drive control network 34. Similarly and substantially exactly symmetrically the reference generator calorimeter 32 is placed in a mounting so that it is exposed to the opposite surface 28 of the graphite block 10, and its electrical output is coupled to the input terminal of the abscissa drive control network 38. As indicated earlier, the standard calorimeter as well as the unknown calorimeter to be tested and the reference generator calorimeter 32 are selected to be operable in the same general range of heat flux and voltage output values. The overall effective gain of the ordinate drive control network 34 is preset to correspond to the sensitivity indicated by the prepared paper calibration sheet 46. That is, the vertical movement of the pen stylus carriage 44 in, for example, centimeters per millivolt, is the same as the scale of the paper along the same direction, i.e., parallel to the ordinate.

Before starting the actual calibration procedure, the straight line characteristic 50 of the standard calorimeter 30 which is accurately known is drawn or printed in advance on the sheet 46 as shown. The first operational step in the calibration of the unknown calorimeter is performed without the presence of the unknown calorimeter in the system shown and consists of varying the amount of energy passing through the ignitron device 18 and hence the magnitude of electric current through the graphite block 10.

In consequence then of the variation of ignitron energy flow, the temperature of the mid-portion of the block 10 and hence the emitted flux rate from its surfaces 26, 28 which is incident upon the sensor faces of the calorimeters 30, 32 may be varied over a range of flux rates from zero to of the order of several hundred B.t.u's per square foot per second. In the present example however, the flux rate range utilized is from zero to approximately 40 B.t.u.'s per square foot per second, as indicated by the abscissa scale on the calibration sheet 46.

The ignitron control 18 is varied back and forth over the indicated range while the variable gain control 40 of the abscissa drive control network 38 is adjusted so that the pen stylus 48 on the carriage 44 traces a characteristic coincident with the straight line characteristic 50 of the standard calorimeter 30.

When the variable gain control is thusly set, the standard calorimeter 30 is removed and replaced, in a disposition identical therewith, by the unknown calorimeter to be tested or calibrated. The calibration sheet 46 may be replaced with a new sheet or not as desired, and the ignitron control varied again to provide a heat flux output from the graphite block surfaces 26, 28 which varies from zero to 35 or 40 B.t.u.'s per square foot per second. While this is achieved the variable gain control 40 of the abscissa drive control network 38 is not altered from its previous calibration setting; hence the characteristic traced by the pen stylus 48 is a plot of the millivolt output of the unknown test calorimeter 30 as a function of the thermal energy flux rate given by the output signal from the reference generator calorimeter 32 under exactly the same reference conditions as obtained with the standard calorimeter during the pre-calibration step outlined above.

Employing the above technique, it may be noted that the unknown calorimeter to be calibrated is compared with substantially ultimate exactness to the standard calorimeter. By placing its in exactly the same position of viewing exactly the same portion of the radiating surface 26 of the graphite block 10 at exactly the same distance and at exactly the same view angle and the like, any lack of symmetry therefore or lack of identical conditions as seen by the reference generator calorimeter 32 as compared with those of the standard and, sequentially, the unknown calorimeter 30, are cancelled out during the two-step calibration process. Furthermore, it is to be emphasized that in spite of the exceedingly high degree of accuracy obtainable by this technique and with the above described system, an unknown calorimeter may be completely calibrated in a time period of the order of one minute by substantially totally unskilled personnel.

When it is desired to maintain the heat flux radiation from the block 10 at a constant level, a feed-back loop may be provided for automatic control of the current required for the desired heat flux output. The loop comprises a control radiation sensor 52 which views a portion of one of the radiating faces of the graphite block 10 and impresses a voltage signal upon the ignitron control network 21. This voltage signal is then utilized therein to maintain the energy flow through the ignitron device 18 at a constant or arbitrarily programmed level as desired for specific applications.

In FIG. 2 the housing and support assembly for the graphite radiating block 10 is illustrated as including a pair of heavy-duty, high current capacity carrying electrodes 60, 62. Each of the electrodes 60, 62 is electrically connected to one of the terminals of the secondary winding of the power transformer by lug connector and cable assemblies 64, 66 respectively. Although the cable conductors of the assemblies 64, 66 are relatively large and rugged, they are flexible to permit the movement of the electrode to which they are attached along a sliding track 68 in a non-conductive heat resistant base member 70. Thusly, the electrodes 60, 62 which are partially split are held firmly, compressively, in high current carrying capacity relationship against electrode engaging portions 72, 74, of the ends 76, 78 of the graphite block 10 by means of a series of tension-supporting screw members 80, which hold the split electrode portions firmly inwardly against the electrode engaging portions of the graphite.

Each of the electrodes in this example, is force-cooled by the flow of coolant water through a circuit including an inlet tube 82 which communicates with the hollow interior of the electrode 60 as indicated by the channel 84 and dotted line, which in turn is connected to an outlet tube 86. A similar cooling circuit is provided for the electrode 62 comprising an inlet tube 88, a channel 90 through the interior of the electrode, and an outlet tube 92.

Substantially surrounding the assembly of graphite block and electrodes, is provided in this example, a water-cooled jacket 94 which is shown in more detail in FIG. 3. The jacket 94 symmetrically surrounds the radiating block and electrode assembly and comprises an inner wall 96 and an outer wall 98, the jacketed space between which is filled with a circulating coolant fed into the jacket by way of an inlet tube 100 and outwardly therefrom by an outlet tube 102. Thusly the coolant-filled jacket thermally isolates the graphite assembly from its environs externally of the jacket.

The jacket 94 also provides means for chemically isolating the heated radiating block 10 from active elements in the atmosphere by circulating continuously a small volume of inert gas such as argon, through a gas inlet tube 104 and out through an outlet tube 106.

The side faces of the jacket 94 are each constructed with a port 108, 110 therein, which are formed in the central portions of the jacket sides as indicated in FIG. 2, and which each form an in-register supporting collar for a calorimeter supporting adaptor 112, 114 respectively. The supporting adaptors are each provided with an internal bore 116 which are in register with each other, so that each views opposite surfaces of the same portion of the graphite radiating block 10. The diameter of the bores 116 is chosen to match the particular calorimeter type to be tested or calibrated.

In the figure a test calorimeter 118 is shown disposed in incident heat flux receiving relation within the supporting adaptor 112, while a reference generator calorimeter 120 of the same general type is shown implaced in like relationship to the radiation of the block 10 within the supporting adaptor 114.

With continuing reference to FIG. 3 as well as to FIG. 2, the partially split nature of the electrodes 60, 62 is illustrated. It may be noted that the outer portion of each electrode is unitary while that portion of the electrode which engages the electrode-engaging surface portions 72, 74 are split longitudinally and are compressively held thereagainst by virtue of tension in the screws 80.

When desired, the supporting adaptors 112, 114 may be provided with force cooling tubing 122 and channels 124 as shown in order to maintain the heat sink body portion of the calorimeter sensors at a reasonably low temperature. Alternatively, the calorimeters may be force cooled themselves by means of internally formed coolant-carrying channels, not shown.

Referring specifically to FIG. 2, a partial barrier for the conduction of thermal energy from the central portion of the radiating block 10 to its end portions 76, 78 is provided by means of a laterally extending array of apertures 126 bored through the graphite block. By this means the longitudinal temperature gradient across this region of the block is significantly higher than that along a portion of the block 10 near its mid-portion, the gradient being caused in large measure by the force cooling of the electrodes 60, 62.

Because of the resulting temperature difference and the inherent fragility of the graphite carbon, a series of laterally spaced, longitudinally extending slots 128 are provided which extend from the ends of the blocks past the apertures 126 and toward the radiating mid-portion of the block 10. These stress-relieving slots permit the relative expansion of the mid-portion with respect to the cooled end portions 76, 78. Further assurance against breaking is provided by terminating the inwardly directed ends of the slots 128 by a circular terminating bore as shown.

Referring to FIG. 4, the resulting longitudinal thermal gradients along the carbon block are indicated by the graph which plots surface temperature of the block 10 along the ordinate as a function of displacement or position along the length of the block on the abscissa. The curve may be seen to include a segment 130 of relatively slight slope which corresponds to a position along the length of the block between its end and a set of the apertures 126. The adjacent segment 132 of the curve, having a high slope value, corresponds to the gradient associated with the block across the thermal barrier formed by the apertures 126. A long, level plateau segment 134 of the curve indicates the resultant substantially gradient-free radiant mid-portion of the block 10. The right-hand portions of the curve are symmetrical with the segments 130, 132 for the obvious reason of symmetry of the geometrical configuration of the block and electrode assembly to which it relates.

The nature of the plateau portion 134 of the curve of FIG. 4 emphasizes one of the advantages of the invention in illustrating the relatively low level of criticality in placement of the calorimeters and in their viewing angle with respect to the surface of the radiant block 10. As may be seen, the radiating mid-portions of the graphite block 10 represent a substantially infinite, or semi-infinite, flat radiating surface as seen by the calorimeter sensing surfaces.

Referring to FIG. 5, an alternative form of the invention is illustrated in which the graphite block 10' is provided near its mid-portion with a bore 136 which extends from its top edge to a point well within the interior of the mid-portion of the block. The resulting cavity, heated by the techniques described above for calorimeter calibration, provides a testing chamber for thermocouples such as the thermocouple 138, shown terminating a pair of dissimilar metallic leads 140.

A second transverse bore 142 is formed perpendicularly to the axis of the bore 136 through which the internal radiating surfaces of a central portion of the bore 136 may be viewed as by an optical pyrometer for purposes of determining extremely accurately the temperature to which the thermocouple 138 is exposed when inserted deeply within the bore 136. By these means and by the indicated technique a thermocouple may be calibrated or checked exceedingly quickly, and again, by substantially totally unskilled personnel.

Figure 7:
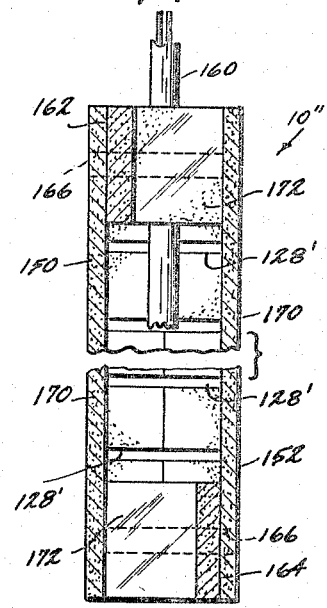
FIG. 7 is a cross-sectional view of the structure of FIG. 6 taken along the lines 7—7 thereof.

In FIG. 6 and FIG. 7, the constructional details of the radiating block of an embodiment of the invention shown in principle in FIG. 5 are illustrated. A composite graphite radiating block 10″ is assembled from a pair of mating elements, in this particular example, machined graphite side plates 150, 152. These plates may be mirror images of each other and are provided, as in the previously described examples, with a series of longitudinally extending, thermal stress relieving slots 128′ formed therein, and which may be terminated by circular bores as shown. Again, a laterally extending series of apertures (not shown) may be provided, when desired, near the ends 76′, 78′ of the composite block. The extreme ends of the block are formed by reduced thickness portions 154 of the side plates 150, 152; the portions 154 providing the electrode-engaging surfaces 72′, 74′.

The cavity 136′ is formed between the back-to-back surfaces 156, 158 of the side plates 150, 152, respectively, which are relieved, as shown, to provide juxtaposed, substantially parallel and planar, facing surfaces which are spaced by a predetermined distance to provide clearance for a thermocouple 160 or other apparatus to be enclosed therebetween. The top and bottom of the cavity 136′ are formed by rectangular parallelopiped graphite bar members 162, 164 which snugly close the top and bottom of the cavity. The graphite bar members may each be permanently secured to one or to respective separate ones of the side plates 150, 152 by a plurality of graphite pegs 166 which extend through the joined members 150–162 and 152–164 as shown more clearly in FIG. 7.

For purposes of increasing the thermal resistance of the bar members 162, 164 so that regions thereof or of the adjacent portions of the side plates 150, 152 will not be significantly cooled with respect to the central portions 170 of the side plates 150, 152, the heat flow path along the bar members 162 and 164 is made tortuous or serpentine. This result is achieved by longitudinally spaced, lateral slots 172 which pass vertically through the height of the block and horizontally through approximately, in this example, two-thirds of the thickness of the bar member. Alternate ones, along the length of the bar members 162, 164, of the slots 172 extend into the member from opposite sides thereof. A vertical access opening 174 may be provided centrally in the upper bar member 162 for insertion and removal therethrough of the testing apparatus such as the thermocouple 160 shown.

In operation, the composite halves of the block 10″ may be held together to form the cavity 136′ and the resultant assembly placed with the electrode engaging surfaces 72′ and 74′ compressively implaced within the split electrode portions as illustrated in the previous figures. The block may then be energized and a thermocouple or other instrument inserted within the cavity 136′ through the access opening 174. Temperature runs may then be made for testing or calibrating the apparatus with temperature or heat flux being monitored, or known as a function of electrical current supplied to the block. When temperature is to be monitored directly, the inserted apparatus may be viewed with an optical pyrometer through an opening, not shown, in the side plate 150.

Figure 8:
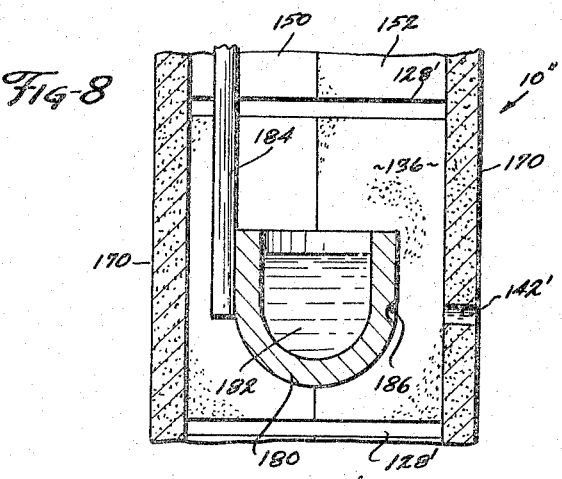
FIG. 8 is a cross-sectional view of a portion of an alternative example of the invention.

Referring to FIG. 8, an example of the invention is illustrated which is particularly advantageous in the field of metallurgical research. The composite graphite block 10', is in substantially the form of the example of FIG. 6 and FIG. 7. In the example of FIG. 8, however, a crucible 180 containing a sample of an alloy 182 is shown suspended within the cavity 136' supported by a rod member 184. The crucible 180 may be provided with a small "black body" hole 186 which is placed in line with a pyrometer viewing opening 142' in the central portion 170 of the graphite side plate 152.

The temperature of the crucible may thus be "viewed" directly by an optical pyrometer for purposes, for example, such as determining the melting point of the alloy sample 182. A particularly useful process of determining such a melting point in accordance with a method aspect of the invention is to view the black body hole, whose temperature very closely follows that of the sample 182 due to the thinness of crucible wall in back of the hole 186, with an optical pyrometer while a run in electrical current variation is being made. When a threshold, or plateau, in the temperature versus time curve is observed due to the latent heat of liquification of the metal, it may properly be concluded that an accurate measure of the melting, or freezing point has been determined, the magnitude of which is the level of the plateau on the curve. By this technique, a relatively unskilled person may very quickly determine the melting point of a new substance even at temperature in excess of 5000° F.

There have thus been disclosed a number of examples of a heat instrument system and method which achieve a significant number of advantages over the known prior art. Some of these advantages are due in large measure to the concept of heat flux instrumentation as opposed to a pure temperature sensing approach. This can be illustrated briefly by considering that heat flux from a radiating black body is proportional to the fourth power of its temperature. If, therefore, as taught here, the heat flux is known with an accuracy of the order of 1%, then the temperature associated therewith is known with an accuracy of the fourth root of 1%. This accuracy should be compared to obtainable prior art temperature sensing accuracies of the order of .25%.

Another conceptually broad advantage of the present invention is that the radiating block is a very high heat capacity source. As an electrical analogy it may be considered a very low impedance source of thermal energy. Almost irrespective of what the operator or researcher chooses to do within the environment of the radiating block, its temperature does not change. Thus experiments or production calibrating may be done rapidly without waiting between readings for the system to stabilize. This capability should be compared with prior art approaches in which a low capacity source, highly insulated from its environs, is used, the temperature of which is severely affected by even the smallest of sensing probes.

Still a further basic advantage is that one may work as closely as a fraction of an inch to the apparatus described without danger of burning. This permits the testing of very short probes such as are used extensively in modern missile technology.

What is claimed is:
1. A calorimeter calibration system comprising:
thermally radiating panel means having a pair of oppositely disposed radiating surfaces;
thermal radiation control means coupled to said radiating panel means for controlling its radiant heat flux rate over a predetermined range of B.t.u.'s per square foot per second and further including:
a source of alternating current electric energy,
a step-down transformer having primary and secondary windings,
an ignitron phase control electric energy flow control network interconnected between said source and said primary winding,
a pair of high current capacity electrodes connected to said secondary winding, and
means for securing said electrodes in high current capacity relationship to respective ones of said electrode engaging surfaces of said radiating block,
mounting means disposed contiguously to each of said radiating surfaces for holding in a precisely repeatably replaceable position with respect thereto, a radiant thermal energy transducer in incident energy sensing exposure relationship toward each of said radiating surfaces; and
longitudinally movable electrode supporting means for holding said electrode securely against any lateral displacement while permitting longitudinal expansion of said radiating block.

2. The invention according to claim 1 which further includes multiple walled jacket means spaced from said radiating block for thermally shielding it from external environs, said jacket means including means for passing coolant fluid therethrough between ones of the multiple walls thereof.

3. The invention according to claim 2 in which said jacket means substantially encloses said radiating block and includes inlet and outlet means for the flow therethrough over said radiating surfaces of an inert gas.

4. The invention according to claim 2 in which said electrodes each includes means for the flow therethrough of a coolant fluid.

5. A calorimeter calibration system comprising:
thermally radiating panel means having a pair of oppositely disposed radiating surfaces;
thermal radiation control means coupled to said radiating panel means for controlling its radiant heat flux rate over a predetermined range of B.t.u.'s per square foot per second and further including:
a source of alternating current electric energy,
a step-down transformer having primary and secondary windings,
an ignitron phase control electric energy flow control network interconnected between said source and said primary winding,
a pair of high current capacity electrodes connected to said secondary winding and including means for providing flow therethrough of a coolant fluid,
means for securing said electrodes in high current capacity relationship to respective ones of said electrode engaging surfaces of said radiating block;
jacket means including multiple, jacketing walls spaced from and substantially enclosing said radiating block for thermally shielding it from its environs, said jacket means including means for passing coolant fluid therethrough between ones of the multiple walls thereof, and further including inlet and outlet means for the flow of an inert gas therethrough over said radiating surfaces of said block;
mounting means formed in said jacket means and forming thermal viewing ports exposed to said oppositely disposed radiating surfaces of a central portion of said radiating block and disposed contiguously to each of said radiating surfaces for holding, in a precisely repeatably replaceable position with respect thereto, a radiant thermal energy transducer in incident energy sensing exposure relationship toward each of said radiating surfaces; and
longitudinally movable electrode supporting means for holding said electrodes securely against any lateral displacement while permitting longitudinal expansion of said radiating block.

6. The invention according to claim 5 which further includes:
first and second calorimeters disposed in said mounting means,
cartesian plotter-recorder means of the character having independent abscissa and ordinate electromechanical drive control networks, and
means for electrically coupling said first calorimeter to said abscissa control network, and
means for electrically coupling said second calorimeter to said ordinate control network.

7. Thermal instrument system comprising:
thermally radiating panel means including a substantially parallelopiped radiating block having a composition including, predominantly graphite carbon and having a pair of relatively low temperature end portions separated by a high temperature mid-portion which is bounded laterally by a pair of oppositely disposed radiating surfaces, said block including temperature gradient regions interposed between said high temperature mid-portion and each of said low temperature end portions, said end portions each having high current capacity electrode engaging surfaces,
said radiating block being characterized by being apertured to define a plurality of perforations relieved through the thickness of said block and extending longitudinally from and through said end portions, through at least a part of said temperature gradient regions, toward said mid-portion for permitting lateral differential thermal expansion of said mid-portion with respect to said end portions.

8. A system for calibrating thermal instruments and the like, comprising:
a block of thermally-radiating material having at least two oppositely disposed radiating surfaces;
electrical means including terminal means for supplying a controlled electrical current to said block of thermally-radiating material whereby to supply heat thereto;
mounting means for supporting said block of thermally-radiating material fixed to said terminal means, said mounting means further including at least two holders for receiving said thermal instruments whereby said thermal instruments receive radiation respectively from each of said radiating surfaces of said block of thermally-radiating material.

9. A system according to claim 8 wherein said block of thermally-radiating material comprises electrically resistive carbon.

10. A system according to claim 8 wherein said block of thermally-radiating material defines internal apertures contiguous to said terminal means, whereby to relieve stresses within said block and afford a gradient-free section therebetween defining said radiating surfaces.

11. A system according to claim 8 further comprising heat-removal means for removing heat from said block.

12. A system according to claim 8 further including means for containing a gaseous atmosphere about said block of thermally-radiating material.

13. A system according to claim 8 further including a plotter recorder and means for driving said plotter recorder along one coordinate in accordance with the output of one of said thermal instruments and means for driving said plotter recorder along the other coordinate in accordance with the output of another of said thermal instruments.

14. A system according to claim 8 wherein said oppositely disposed radiating surfaces comprise planar parallel surfaces and further wherein the terminal ends of said block define apertures remote from said radiating surfaces whereby to afford a gradient-free section of said block under said surfaces.

References Cited by the Examiner

UNITED STATES PATENTS

| | | | |
|---|---|---|---|
| 1,282,029 | 10/1918 | Bemis | 13—25 |
| 2,279,445 | 4/1942 | Clancy | 338—332 |
| 2,902,525 | 9/1959 | Barker | 13—25 |

OTHER REFERENCES

Harrison: Radiation Pyrometry and its Underlying Principles of Radiation Heat Transfer. John Wiley and Sons, New York, 1960, QC338H3, pp. 83, 84.

LOUIS R. PRINCE, *Primary Examiner.*

S. C. SWISHER, *Assistant Examiner.*